United States Patent
Stromberg

(10) Patent No.: US 6,718,221 B1
(45) Date of Patent: Apr. 6, 2004

(54) NONPARAMETRIC CONTROL CHART FOR THE RANGE

(75) Inventor: Arnold J. Stromberg, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 10/442,330

(22) Filed: May 21, 2003

Related U.S. Application Data
(60) Provisional application No. 60/382,168, filed on May 21, 2002.

(51) Int. Cl.[7] .............................................. G06F 17/06
(52) U.S. Cl. ...................... 700/109; 700/108; 700/110; 700/95
(58) Field of Search .......................... 700/95, 108, 109, 700/110

(56) References Cited

U.S. PATENT DOCUMENTS

| | | | | |
|---|---|---|---|---|
| 5,225,998 A | * | 7/1993 | Singhal | 702/84 |
| 5,311,131 A | | 5/1994 | Smith | |
| 5,442,562 A | * | 8/1995 | Hopkins et al. | 700/108 |
| 5,467,883 A | | 11/1995 | Frye et al. | |
| 5,510,976 A | | 4/1996 | Tanaka et al. | |
| 5,644,232 A | | 7/1997 | Smith | |
| 5,649,070 A | | 7/1997 | Connell et al. | |
| 5,682,465 A | | 10/1997 | Kil et al. | |
| 5,694,524 A | | 12/1997 | Evans | |
| 5,737,496 A | | 4/1998 | Frye et al. | |
| 5,818,231 A | | 10/1998 | Smith | |
| 5,835,901 A | | 11/1998 | Duvoisin, III et al. | |
| 5,841,676 A | * | 11/1998 | Ali et al. | 702/84 |
| 5,937,372 A | | 8/1999 | Gould | |
| 5,943,237 A | * | 8/1999 | Van Boxem | 700/108 |
| 6,032,106 A | | 2/2000 | Ishii | |
| 6,055,463 A | * | 4/2000 | Cheong et al. | 700/223 |
| 6,098,063 A | | 8/2000 | Xie et al. | |
| 6,110,214 A | * | 8/2000 | Klimasauskas | 703/2 |
| 6,131,076 A | | 10/2000 | Stephan et al. | |
| 6,134,510 A | | 10/2000 | Deco et al. | |
| 6,141,647 A | * | 10/2000 | Meijer et al. | 705/1 |
| 6,246,972 B1 | * | 6/2001 | Klimasauskas | 703/2 |
| 6,363,333 B1 | | 3/2002 | Deco et al. | |
| 6,396,270 B1 | | 5/2002 | Smith | |
| 6,424,876 B1 | * | 7/2002 | Cusson et al. | 700/108 |
| 6,522,939 B1 | * | 2/2003 | Strauch et al. | 700/116 |
| 2002/0082495 A1 | | 6/2002 | Biswal et al. | |
| 2002/0127529 A1 | | 9/2002 | Cassuto et al. | |
| 2002/0169579 A1 | | 11/2002 | Gould | |
| 2003/0006770 A1 | | 1/2003 | Smith | |

* cited by examiner

*Primary Examiner*—Leo Picard
*Assistant Examiner*—Michael D. Masinick
(74) *Attorney, Agent, or Firm*—King & Schickli, PLLC

(57) ABSTRACT

The method comprises establishing the number of subsets of a dataset that have a range of the difference between any two datapoints within the dataset, and computing a control chart for the range based thereon. In another aspect, a software program for accomplishing the method of the present invention is provided. The method of the invention allows monitoring variability of a product being produced by a particular piece of machinery, of a process conducted by the machinery, or of a product stream generated thereby, accurately detecting changes in variability in real time. The true distribution of the data is reflected, and the desired result is achieved without requiring an inordinate number of computations.

15 Claims, 3 Drawing Sheets

US 6,718,221 B1

NONPARAMETRIC CONTROL CHART FOR THE RANGE

This application claims the benefit of U.S. Provisional Patent Application Ser. No. 60/382,168 filed May 21, 2002.

TECHNICAL FIELD

The present invention relates to process monitoring, and more specifically to real-time monitoring of processes wherein quality of an end product must be kept within certain desired parameters. More particularly, the present invention provides a control chart means for monitoring product quality wherein control limits are based on jackknife histograms, wherein the control limits for the range reflect a true distribution of data collected rather than a fictional normal distribution.

COPYRIGHTED MATERIALS

A portion of the disclosure of this patent document contains materials to which a claim of copyright protection is made. The copyright owner has no objection to the reproduction by anyone of the patent document or the patent disclosure as it appears in the U.S. Patent and Trademark Office patent files or records, but reserves all other rights with respect to the copyrighted work.

BACKGROUND OF THE INVENTION

It is known to use control charts in manufacturing processes to monitor the equipment used therein to ensure that the end products are produced in a consistent manner. If, for example, a physical dimension of a product exceeds a predetermined parameter, it is necessary to discontinue production, repair or recalibrate the equipment, and restart the process. Conventional control charts for size parameters (for example, X-bar charts for control limits based on the mean) are effective for their intended purpose. However, conventional control charts for variability, which rely heavily on normality assumptions which are often violated in practice, are inaccurate and may result in unnecessary stoppage of machinery to correct a nonexistent problem.

Conventional control charts for the range assume a normal distribution of data (i.e. set controls limits based on normality), and calculate parameters using a constant based on the distribution of the range. Thus, conventional control charts are symmetric, which is disadvantageous when the data obtained exhibit a skewed distribution. Disadvantageously, for equal subsample sizes, conventional (normal theory) control charts are the only control charts provided by many statistical computing packages. Accordingly, when the data distribution is not normal, conventional control charts perform poorly in assessing product parameters for quality control.

A need is therefore identified in the art for methods for monitoring variability of a product being produced by a particular piece of machinery, of of a process conducted by the machinery, or of a product stream generated thereby, which is capable of accurately detecting changes in variability in real time. The method should provide useful results in the absence of an assumption of normal data, and should establish new control limits for the range which reflect the true distribution of the data. It is further important that the method achieve the desired results without requiring an inordinate number of computations.

SUMMARY OF THE INVENTION

In accordance with a first aspect of the invention, a method for establishing a control limit for variability of a manufacturing process parameter is provided, comprising the steps of measuring the parameter over a predetermined period of time, assembling a dataset having a plurality of datapoints, wherein each datapoint represents an individual measured value of the parameter, rank-ordering the datapoints within the dataset, and selecting at least one subset of the dataset, wherein the subset is a predetermined number of datapoints having a high measured value and a low measured value defining a rank-ordered range of measured parameter values. All possible numbers of subsamples of the dataset having the range defined by the selected subset are calculated in accordance with formulae which will be described below. The steps of selecting a subset and calculating all possible numbers of subsamples of the dataset having the range defined by the selected subset are repeated until all possible numbers of ranges have been calculated for all possible subsets of the predetermined size to define a set of possible ranges. The set of possible ranges is then rank-ordered.

Finally, control limits for the range for the manufacturing process are established, defined by an upper control limit and a lower control limit, wherein the upper and lower limits are defined as a predetermined percentile of the rank-ordered set of ranges. The method of the present invention may be adapted to a jackknife method (without sample replacement) or a bootstrap method (with sample replacement) for computing control limits.

For the jackknife method, if the ordered data set from smallest to largest is denoted $x_{(1)}, x_{(2)}, \ldots x_{(N)}$ and the subsample size is n, then all possible numbers of a datapoint subsample having the range defined by the subset $(x_{(h)} - x_{(g)})$ are calculated in accordance with the formula:

$$\binom{h-g-1}{n-2}$$

where h is the highest measured value within a range, g is the lowest measured value within a range, and n is the number of observations within the subset.

For the bootstrap method, the calculation relies on the relationship between the highest measured value within a range and the lowest measured value within a range. When the relationship between the highest measured value and the lowest measured value in a range is defined by the equation g=h where h is the highest measured value within a range and g is the lowest measured value within a range, the range is zero for n subsamples. When the relationship between g and h is defined by the equation g=h−1, the control limits are defined by the range of $2^n - 2$ subsets, where n is the number of observations within the subset. When the relationship between the highest measured value and the lowest measured value in a range is defined by the equation g<h−1, all possible numbers of a subsample of the dataset having the range defined by the subset (depicted as $x_{(h)} - x_{(g)}$) are calculated in accordance with the formula:

$$\sum_{c=1}^{n-1}\sum_{d=1}^{n-c}\binom{n}{c}\binom{n-c}{c}(h-g-c-d+1)^{n-c-d}$$

where n is the number of observations within the subset, c is the number of times the lowest measured value appears in the subset, d is the number of times the highest measured value appears in the subset, h is the highest measured value within a range and g is the lowest measured value within a range.

In another aspect, the present invention provides a computer software program for establishing a control limit for variability of a manufacturing process parameter, wherein the software performs the steps of rank-ordering a plurality of datapoints within a dataset, wherein each datapoint represents an individual measured value of the parameter. Next the software selects at least one subset of the dataset, wherein the subset is a predetermined number of datapoints having a high measured value and a low measured value defining a rank-ordered range of measured parameter values. All possible numbers of subsamples of the dataset having the range defined by the selected subset are calculated by the software in accordance with formulae described above. The software then repeats the steps of selecting a subset and calculating all possible numbers of subsamples of the dataset having the range defined by the selected subset until all possible numbers of ranges have been calculated for all possible subsets of the predetermined size to define a set of possible ranges. The set of possible ranges is then rank-ordered.

The software then sets control limits for the range for the manufacturing process, defined by an upper control limit and a lower control limit, wherein the upper and lower limits are defined as a predetermined percentile of the rank-ordered set of ranges. Finally, the software performs the step of comparing subsequent datapoints against the control limits to ensure that the parameter is within a predetermined variability range. The software may be used to establish jackknife and bootstrap control limits as described above, and in accordance with the equations described above.

In yet another aspect of the invention, a method is provided for establishing a control limit for variability of a manufacturing process parameter, comprising the steps of measuring the parameter over a predetermined period of time, and assembling a dataset having a plurality of datapoints representing a measured value of the parameter. Next, for each possible value for the range of a predetermined subsample size, the number of subsamples within the dataset having that range is calculated using the formulae described above. The set of ranges derived thereby is rank-ordered, and control limits for the manufacturing process are established as upper and lower control limits defined as a percentile of the rank-ordered set of ranges.

DETAILED DESCRIPTION OF THE INVENTION

Figure 1:
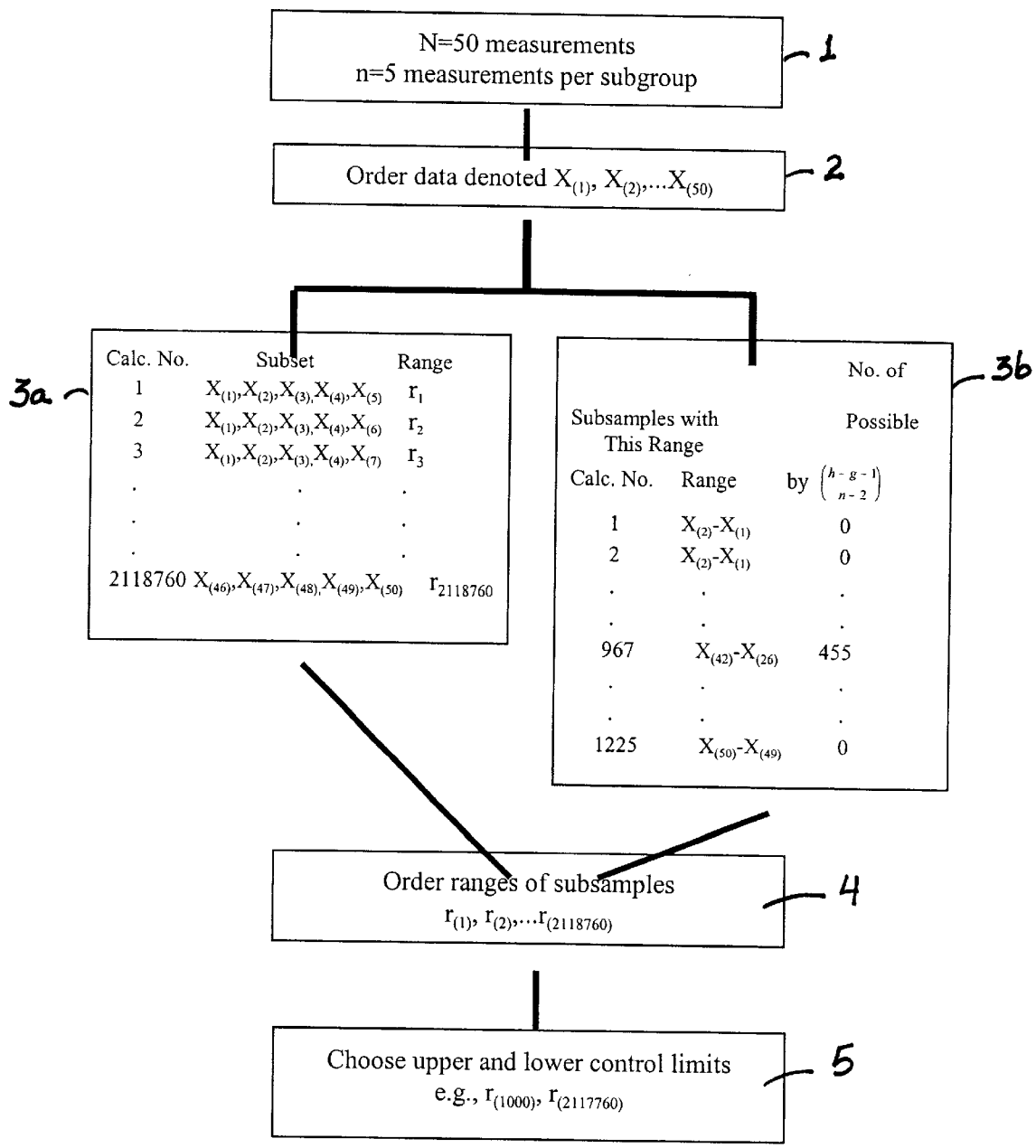
FIG. 1 is a flow chart depicting the method of the present invention for establishing a control limit for variability of a manufacturing process parameter using a jackknife control chart.

As described above, it is desirable to utilize a sampling range to define control limits for variability in a manufacturing process, i.e. the point at which variability in a product stream requires repair or recalibration. It is known in the art to utilize a bootstrap method with random sampling for calculating control limits (wherein samples of a predetermined size are removed from a process stream, and subsampled to define ranges with which to establish control limits, followed by replacement of the subsamples in the larger sample). Such a method can be represented as:

1. Collecting k random samples of size n, resulting in a total of N=nk data points.
2. Selecting a random sample of size n with replacement from the N data point and compute the sample range for this new sample.
3. Repeating step 2 B times.
4. Using an appropriate percentile of the resampled ranges to establish the control limits.

It will be appreciated that the desired percentiles for use in calculating control limits for various manufacturing processes are known in the art or can be ascertained without undue experimentation, and vary in accordance with the process being evaluated. For example, a process for manufacture of toys will require a relatively less rigorous tolerance than, for example, the manufacture of ball bearings or airplane parts, and allows correspondingly broader control limits. Similarly, the number of times step 2 must be repeated (B) is known in the art for various manufacturing processes or can be ascertained without undue experimentation.

It is also known to use a jackknife method with random sampling for calculating control limits (wherein samples of a predetermined size are removed from a process stream, and subsampled to define ranges with which to establish control limits, without replacement of the subsamples in the larger sample). Such a method can be represented as:

5. Collecting k random samples of size n, resulting in a total of N=nk data points.
6. Selecting a random sample of size n without replacement from the N data point and compute the sample range for this new sample.
7. Repeating step 2 B times.
8. Using an appropriate percentile of the resampled ranges to establish the control limits.

The above-referenced methods for computing control limits (confidence intervals) for the range have the drawback that they are not deterministic, i.e. that if the method is repeated on the same dataset a second time, different control limits may result. Accordingly, consideration has been given to establishing exact range control limits based on the jackknife or bootstrap methods, calculated by the steps of:

1. Collecting k random samples of size n, resulting in a total of N=nk data points.
2. Selecting any sample of size n without replacement (jackknife method) or with replacement (bootstrap method) from the N data points and computing the sample range for this new sample.
3. Repeating step 2 for all possible subsamples n.
4. Using an appropriate percentile of the resampled ranges as the control limits.

The exact control limit method has the advantage of being deterministic, i.e. unlike the above methods based on random sampling, repeating the analysis on the same dataset will provide the same control limits. However, given conventional computational technology, computing the ranges of all conceivable subsamples may be impossible for some datasets.

Surprisingly, it has been discovered that the need to actually calculate the ranges of all possible subsamples may be avoided by rank-ordering the dataset N, represented as $x_{(1)}, x_{(2)}, \ldots x_{(N)}$, followed by counting the number of subsets of the data that have a range equalling the difference between any two datapoints within the dataset. This step is repeated for each possible range between sets of datapoints $x_{(h)}-x_{(g)}$. The method of the present invention is adaptable to both the jackknife and bootstrap methods described above. If the dataset is so ordered, for the jackknife method the range $x_{(h)}-x_{(g)}$ will be the range of:

$$\binom{h-g-1}{n-2}$$

where h is the highest measured value within a range, g is the lowest measured value within a range, and n is the number of observations within the subset.

For the bootstrap method, the calculation is dependent on the relationship between h and g. In the first case (g=h), the range will be 0 for n subsamples. If the relationship can be defined as g=h−1, then the range $x_{(h)}-x_{(g)}$ will be the range of $2^n-2$ subsets, because there are two choices for each selection, but not all the selections can be the same.

If the relationship can be defined as g<h−1, then the calculation is based on the number of times $x_g$, denoted c, appears in the subsample and the number of times $x_h$, denoted d, appears in the subsample. The range $x_{(h)}-x_{(g)}$ will be the range of:

$$\sum_{c=1}^{n-1}\sum_{d=1}^{n-c}\binom{n}{c}\binom{n-c}{c}(h-g-c-d+1)^{n-c-d}$$

where n is the number of observations within the subset, c is the number of times the lowest measured value appears in the subset, d is the number of times the highest measured value appears in the subset, h is the highest measured value within a range and g is the lowest measured value within a range.

FIG. 1 schematically depicts one embodiment of the invention, wherein exact jackknife control limits for the range are calculated in accordance with the method of the present invention. From a process stream, 50 measurements (N=50) are taken (see Step 1). A subset size of 5 measurements (n=5) is selected. In Step 2, the data are then rank-ordered in ascending order, shown as $X_{(1)}, X_{(2)}, \ldots X_{(50)}$. As shown in Step 3a, the next step is to determine all possible combinations of subsets of the dataset wherein n=5. In this case, there are 2,118,760 possible combinations, depicted schematically as $r_1$ through $r_{2118760}$. In Step 3b, all possible numbers of subsamples of the dataset having the range defined by the subset (n=5) are calculated in accordance with the formula described above. In the example shown, a total of 1,225 subsamples are possible. The ranges are then rank-ordered in ascending order based on the calculated number of possible ranges (Step 4), and the upper and lower control limits are selected as a percentile of the rank-ordered ranges.

Other aspects of the present invention will become apparent to those skilled in this art from the following description wherein there is shown and described a preferred embodiment of this invention, simply by way of illustration of one of the modes best suited to carry out the invention. As it will be realized, this invention is capable of other different embodiments and its several details are capable of modification in various, obvious aspects all without departing from the intended scope of the invention. Accordingly, the descriptions and examples herein will be regarded as illustrative in nature and not as restrictive.

EXAMPLE 1

Standard normal (N(0, 1)) data, t distribution data with varying degrees of freedom (t(df)), and exponential data with mean 1 (Exp(1)) were evaluated. In each case, 1000 trials were used. Table 1 presents results for a=0.0027 control limits for the range with N=250 and n=5. An average run length (ARL) of 370 was considered ideal. As shown in Table 1, normal theory (NT) control limits performed poorly even for standard normal data in comparison to the bootstrap (BS) and jackknife (JK) control limits. As the data non-normality increased, NT control limits performed even more poorly. The BS and JK control limits also exhibited decreasing ARL's as non-normality increased, but performance was better than the NT control limits in all cases.

Table 1

Evaluation of datasets of varying degrees of normality using normal theory, bootstrap, and jackknife control limits.

| Meth | L. Limit | U. Limit Data | ARL |
|---|---|---|---|
| | N(0,1) | | |
| BS | .353 (.0007) | 5.296 (0.00848) | 383 (17.58) |
| JK | .3703 (.0008) | 5.1921 (.0132) | 336 (14.41) |
| NT | 0 (0) | 4.9868 (.0080) | 311 (15.65) |
| DT | .3693 (.0006) | 5.469 (.0090) | 467 (15.96) |
| | t(30) | | |
| BS | .3571 (.0007) | 5.611 (.0177) | 369 (15.17) |
| JK | .3768 (.0008) | 5.5892 (.0170) | 308 (12.11) |
| NT | 0 (0) | 5.1631 (.0086) | 192 (7.91) |
| DT | .3817 (.0006) | 5.6532 (.0097) | 305 (10.93) |
| | t(20) | | |
| BS | .3609 (.0008) | 5.8192 (.0195) | 353 (16.69) |
| JK | .3812 (.0008) | 5.8507 (.0189) | 317 (12.67) |
| NT | 0 (0) | 5.2375 (.0090) | 157 (6.60) |
| DT | .3891 (.0007) | 5.7632 (.0106) | 266 (9.99) |
| | t(10) | | |
| BS | .3667 (.0008) | 6.6073 (.0285) | 321 (17.0) |
| JK | .3873 (.0008) | 6.5767 (.0271) | 280 (13.79) |
| NT | 0 (0) | 5.5444 (.0104) | 86 (3.50) |
| DT | .4098 (.0008) | 6.0699 (0.113) | 131 (4.47) |
| | t(5) | | |
| BS | .3824 (.0007) | 8.8236 (.0612) | 239 (13.25) |
| JK | .4037 (.0009) | 8.9409 (.0637) | 207 (8.80) |
| NT | 0 (0) | 6.2662 (.0141) | 41 (1.45) |
| DT | .4616 (.0010) | 6.8372 (.0148) | 54 (1.90) |
| | Exp(1) | | |
| BS | .1909 (.0004) | 6.0627 (.0401) | 157 (9.87) |
| JK | .2007 (.0006) | 6.0980 (.0402) | 149 (8.08)) |
| NT | 0 (0) | 4.4759 (.0117) | 25 (0.91) |
| DT | .3309 (.0009) | 4.9014 (.0127) | 27 (0.94) |

∝ = .002 Control Limits, ARL's and their Standard Errors for Range Control Charts with N = 250, n = 5

EXAMPLE 2

One thousand samples of size n=5, drawn randomly from dataset having a t distribution with 10 degrees of freedom, were considered. The results are presented in Table 2. The first 100 samples were used to compute control limits. The Shapiro-Wilks normality test had a p-value of 0.9994, demonstrating only a slight departure from normality. Using α=0.0027, an ideal control limit would be set such that only approximately 3 out of 1000 samples would fall outside the control limits. FIG. 1 shows the control chart for the mean for the data. None of the sample means were out of the control limits. Using the same control limits for the other 900 samples (not shown) resulted in 4 samples outside the control limits, suggesting that the conventional control chart for the mean performed as expected.

Figure 2:
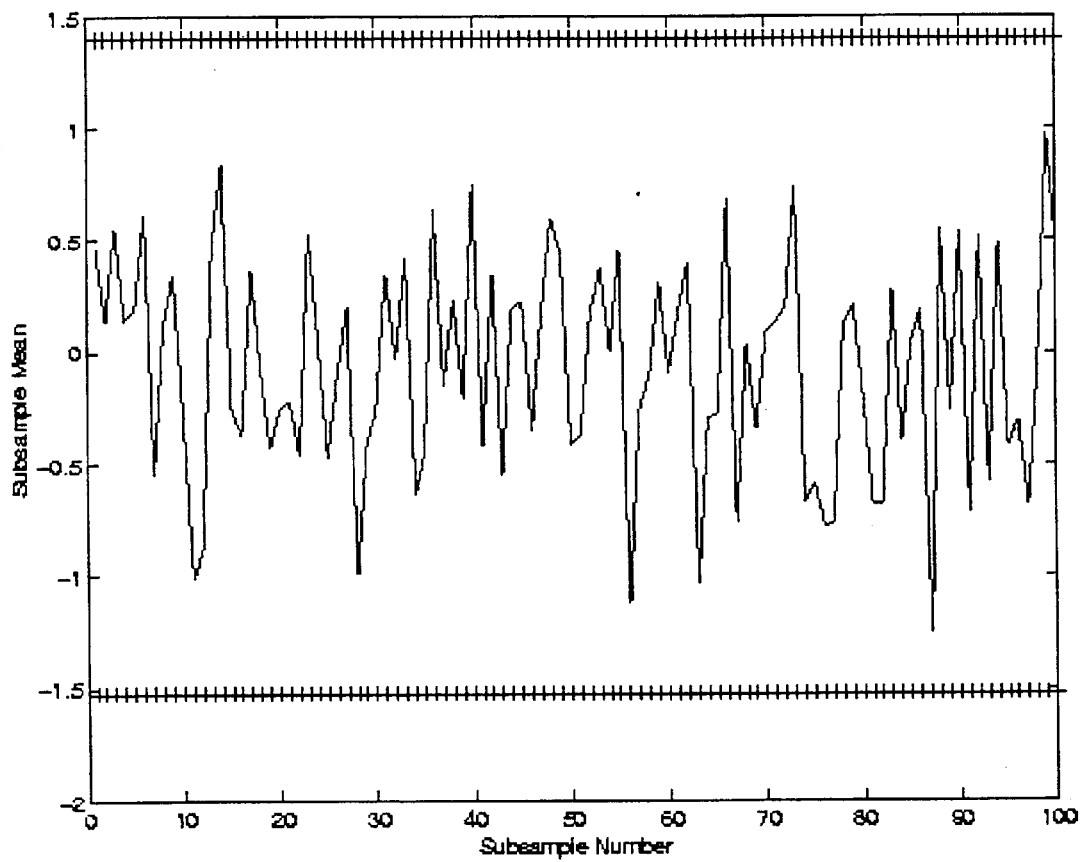
FIG. 2 graphically shows control limits for the first 100 samples from a representative data set, established using a conventional control chart for the mean, wherein crossed lines depict conventional upper and lower control limits.
Figure 3:
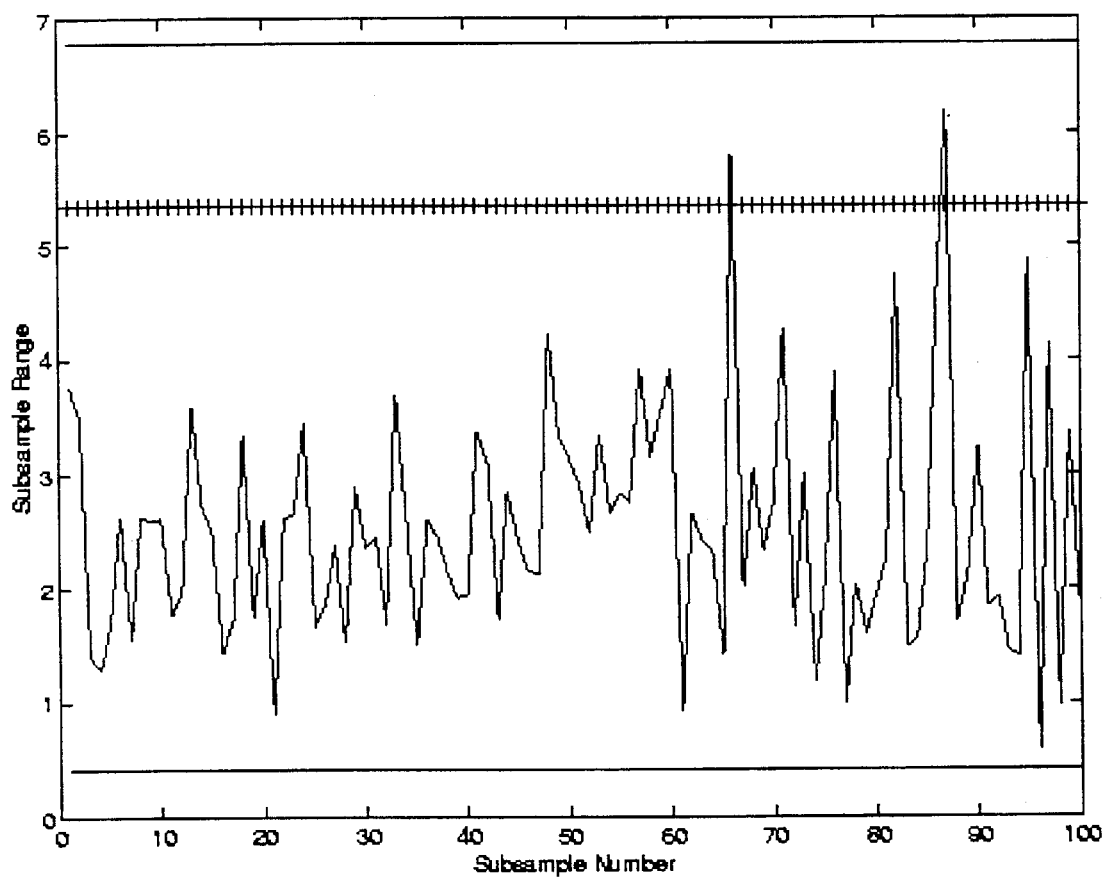
FIG. 3 graphically shows control limits for the first 100 samples from a representative data set, established using the control chart for the range of the present invention, wherein the solid horizontal lines depict upper and lower control limits calculated by the resampling method of the present invention, and the crossed horizontal line represents an upper control limit established using conventional methods.

The conventional control chart for the range (R chart) control limits were calculated to be 0 and 5.36. Calculated using the method of the present invention, the jackknifed control limits were at (0.4158, 6.768) and the bootstrap control limits were at (0.4065, 6.768). A plot of these limits and ranges for the first 100 samples is shown in FIG. 2. It will be appreciated that two of the sample ranges were outside the standard control limits, but none outside the jackknifed or bootstrap limits. Using the same control limits for the remaining 900 samples (not shown), 11 points plotted outside the standard control limits, but only 2 outside the jackknife or bootstrap control limits. It is thus shown that the bootstrapped or jackknifed control limits established by the method of the present invention outperformed control limits established by conventional methods.

EXAMPLE 3

In another aspect of the present invention, computer executable instructions as part of computer readable media may be used to accomplish the method of the present invention. When described in the context of computer readable media having computer executable instructions stored thereon, it is denoted that the instructions include program modules, routines, programs, objects, components, data structures, and patterns that perform particular tasks or implement particular abstract data upon or within various structures of the computing environment. Executable instructions exemplarily comprise instructions and data which cause a general purpose computer, special purpose computer, or special purpose processing device to perform a certain function or group of functions. A copy of the source code coding for the computer executable instructions embodying a presently preferred embodiment of the present invention is appended hereto as a Code Appendix, and is incorporated herein by reference.

The foregoing description is presented for purposes of illustration and description of the various aspects of the invention. The descriptions are not intended to be exhaustive or to limit the invention to the precise form disclosed. The embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for establishing a control limit for variability of a manufacturing process parameter, comprising:
    measuring the parameter over a predetermined period of time;
    assembling a dataset having a plurality of datapoints, wherein each datapoint represents an individual measured value of the parameter;
    rank-ordering the datapoints within the dataset;
    selecting at least one subset of the dataset, wherein the subset is a predetermined number of datapoints including a high measured value and a low measured value defining a range of measured parameter values;
    calculating all possible numbers of a subsample of the dataset having the range defined by the subset;
    repeating the previous steps of selecting a subset and calculating all possible numbers of subsamples of the dataset having the range defined by the subset, until all possible numbers of ranges have been calculated for all possible subsets of the predetermined size within the dataset to define a set of ranges;
    rank-ordering the defined set of ranges; and
    establishing the control limit for the manufacturing process, defined by an upper limit and a lower limit wherein the upper and lower limits are a predetermined percentile of the rank-ordered set of ranges.

2. The method of claim 1, wherein the control limit is established using a jackknife method.

3. The method of claim 1, wherein the control limit is established using a bootstrap method.

4. The method of claim 2, wherein the possible numbers of a subsample of the dataset having the range defined by the subset are calculated in accordance with the formula:

$$\binom{h-g-1}{n-2}$$

where h is the highest measured value within a range, g is the lowest measured value within a range, and n is the number of observations within the subset.

5. The method of claim 3, wherein the relationship between the highest measured value and the lowest measured value in a range is defined by the equation g=h where h is the highest measured value within a range and g is the lowest measured value within a range.

6. The method of claim 3, wherein the relationship between the highest measured value and the lowest measured value in a range is defined by the equation g=h−1 where h is the highest measured value within a range and g is the lowest measured value within a range, and the control limits are defined by the range of $2^n-2$ subsets, where n is the number of observations within the subset.

7. The method of claim 3, wherein the possible numbers of a subsample of the dataset having the range defined by the subset are calculated in accordance with the formula:

$$\sum_{c=1}^{n-1}\sum_{d=1}^{n-c}\binom{n}{c}\binom{n-c}{c}(h-g-c-d+1)^{n-c-d}$$

where n is the number of observations within the subset, c is the number of times the lowest measured value appears in the subset, d is the number of times the highest measured value appears in the subset, h is the highest measured value within a range and g is the lowest measured value within a range.

8. A computer software program for establishing a control limit for variability of a manufacturing process parameter, wherein the software performs the steps of:
    rank-ordering a plurality of datapoints within a dataset, wherein each datapoint represents an individual measured value of the parameter;
    selecting at least one subset of the dataset, wherein the subset is a predetermined number of datapoints including a high measured value and a low measured value defining a rank-ordered range of measured parameter values;

calculating all possible numbers of a subsample of the dataset having the range defined by the subset;

repeating the previous steps of selecting a subset and calculating all possible numbers of subsamples of the dataset having the range defined by the subset, until all possible numbers of ranges have been calculated for all possible subsets of the predetermined size within the dataset to define a set of ranges;

rank-ordering the defined set of ranges;

establishing the control limit for the manufacturing process, defined by an upper limit and a lower limit wherein the upper and lower limits are defined as a predetermined percentile of the rank-ordered set of ranges; and comparing a subsequent datapoint against said control limit to ensure that the parameter is within a predetermined variability range.

9. The software program of claim 8, wherein the control limit is established by a jackknife method.

10. The software program of claim 8, wherein the control limit is established by a bootstrap method.

11. The software program of claim 9, wherein the possible numbers of a subsample of the dataset having the range defined by the subset are calculated in accordance with the formula:

$$\binom{h-g-1}{n-2}$$

where h is the highest measured value within a range, g is the lowest measured value within a range, and n is the number of observations within the subset.

12. The software program of claim 10, wherein the relationship between the highest measured value and the lowest measured value in a range is defined by the equation g=h where h is the highest measured value within a range and g is the lowest measured value within a range.

13. The software program of claim 10, wherein the relationship between the highest measured value and the lowest measured value in a range is defined by the equation g=h−1 where h is the highest measured value within a range and g is the lowest measured value within a range, and the control limits are defined by the range of $2^n-2$ subsets, where n is the number of observations within the subset.

14. The software program of claim 10, wherein the possible numbers of a subsample of the dataset having the range defined by the subset are calculated in accordance with the formula:

$$\sum_{c=1}^{n-1}\sum_{d=1}^{n-c}\binom{n}{c}\binom{n-c}{c}(h-g-c-d+1)^{n-c-d}$$

where n is the number of observations within the subset, c is the number of times the lowest measured value appears in the subset, d is the number of times the highest measured value appears in the subset, h is the highest measured value within a range and g is the lowest measured value within a range.

15. A method for establishing a control limit for variability of a manufacturing process parameter, comprising:

measuring the parameter over a predetermined period of time;

assembling a dataset having a plurality of datapoints, wherein each datapoint represents an individual measured value of the parameter;

rank-ordering the datapoints within the dataset;

defining a predetermined subset size;

for each possible value for the range of the predetermined subset size, calculating the number of subsamples within the dataset which provide the range defined by the subset to define a set of ranges;

rank-ordering the set of all ranges; and establishing control limits defined by an upper control limit and a lower control limit for the manufacturing process, wherein the upper and lower control limits are a predetermined percentile of the rank-ordered set of all ranges.

* * * * *